(12) United States Patent
Sugiura

(10) Patent No.: US 7,223,006 B2
(45) Date of Patent: May 29, 2007

(54) SURFACE-EMITTING DEVICE AND LIQUID CRYSTAL DISPLAY APPARATUS

(75) Inventor: Takuro Sugiura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 92 days.

(21) Appl. No.: 11/212,694

(22) Filed: Aug. 24, 2005

(65) Prior Publication Data

US 2006/0044827 A1   Mar. 2, 2006

(30) Foreign Application Priority Data

Aug. 31, 2004   (JP) .............................. 2004-252029

(51) Int. Cl.
*F21V 7/04*      (2006.01)
*G02F 1/1335*    (2006.01)

(52) U.S. Cl. ...................... 362/616; 362/603; 362/610; 362/620; 362/621; 349/63; 349/65

(58) Field of Classification Search ................ 362/560, 362/600, 603, 606, 608–610, 612, 616–617, 362/620–621, 628; 385/50, 146; 349/63, 349/65

See application file for complete search history.

(56) References Cited

U.S. PATENT DOCUMENTS

| | | | |
|---|---|---|---|
| 6,474,826 B1 * | 11/2002 | Tanaka et al. ............... | 362/612 |
| 6,561,660 B2 * | 5/2003 | Huang ......................... | 362/27 |
| 6,636,283 B2 * | 10/2003 | Sasagawa et al. ............. | 349/65 |
| 6,644,824 B2 * | 11/2003 | Baba ............................ | 362/609 |
| 6,802,619 B2 * | 10/2004 | Ohizumi et al. ............. | 362/603 |
| 6,808,282 B2 * | 10/2004 | Ishitaka ....................... | 362/610 |
| 2003/0117792 A1 * | 6/2003 | Kunimochi et al. ........... | 362/31 |
| 2003/0165067 A1 * | 9/2003 | Imamura et al. ............. | 362/560 |
| 2003/0169585 A1 * | 9/2003 | Okuwaki ...................... | 362/31 |
| 2003/0174491 A1 * | 9/2003 | Ohizumi et al. .............. | 362/31 |
| 2004/0212981 A1 * | 10/2004 | Wang et al. ................... | 362/31 |

* cited by examiner

*Primary Examiner*—Alan Cariaso
*Assistant Examiner*—Leah S Lovell
(74) *Attorney, Agent, or Firm*—Brinks Hofer Gilson & Lione

(57) ABSTRACT

A front light including a light-guiding plate for receiving light from a light-entering surface and emitting the light from a light-emitting surface, an intermediate light-guiding body disposed along the light-entering surface, light-emitting elements disposed at longitudinal ends of the intermediate light-guiding body. A side surface of the intermediate light-guiding body adjacent to the light-entering surface of the light-guiding plate is a light-emitting surface for emitting light from the light-emitting elements to the light-guiding plate. A side surface opposite to the light-emitting surface is a reflective surface. The total length of the intermediate light-guiding body and the light-emitting elements is the same as the width of the light-guiding plate, the length of at least the light-emitting surface of the intermediate light-guiding body is the same as the width of the light-guiding plate, and the length of the reflective surface is smaller than the length of the light-emitting surface.

7 Claims, 8 Drawing Sheets

SURFACE-EMITTING DEVICE AND LIQUID CRYSTAL DISPLAY APPARATUS

This application claims the benefit of priority to Japanese Patent Application No. 2004-252029 filed on Aug. 31, 2004, herein incorporated by reference.

BACKGROUND OF THE INVENTION

1. Field of the Invention

The present invention relates to a surface-emitting device and a liquid crystal display apparatus including the surface-emitting device.

2. Description of the Related Art

As a surface-emitting device, a back light or a front light of a reflective liquid crystal display apparatus included in a portable electronic appliance, such as a mobile phone, is known.

Such a known front light is a unit including a light source, an intermediate light-guiding body, a light-guiding plate, and a case for containing these components, whose inner surfaces are reflective.

FIG. 16 is a perspective view of a known liquid crystal display apparatus having such a structure.

The liquid crystal display apparatus illustrated in FIG. 16 includes a liquid crystal display unit 120 and a front light 110 disposed on the front side of the liquid crystal display unit 120 (for example, refer to US Patent No. 20030174491). Details of the structure of the liquid crystal display unit 120 are not shown in the drawing. The liquid crystal display unit 120 is a reflective liquid crystal display unit that displays an image by reflecting light that enters through the front surface. The liquid crystal display unit 120 includes a liquid crystal layer interposed between an upper substrate 121 and a lower substrate 122, wherein the substrates face each other. The liquid crystal display unit 120 displays images by controlling the alignment of the liquid crystal layer so as to change the transmission state of light.

The front light 110 includes a flat light-guiding plate 112, a cylindrical intermediate light-guiding body 113 disposed on an end surface 112a of the light-guiding plate 112, and light-emitting elements 115 and 115 disposed on both longitudinal ends of the intermediate light-guiding body 113. A plurality of protrusions 114 each having a wedge-shaped cross-section is provided on the upper surface of the light-guiding plate 112. The protrusions 114 are disposed parallel to each other to form a prismatic structure.

In the front light 110, light beams emitted from the light-emitting elements 115 and 115 travel through the intermediate light-guiding body 113 to end surface 112a of the light-guiding plate 112 and are guided into the light-guiding plate 112. Then, the light beams are reflected at the inner side of the upper surface of the protrusions 114 on the light-guiding plate 112 in a manner such that the traveling direction of the light beams is changed. As a result, the light beams are emitted downward from the light-guiding plate 112 toward the liquid crystal display unit 120, as illustrated in the drawing.

The known front light 110 is designed so that the total length L of the intermediate light-guiding body 113 and the light-emitting elements 115 and 115 disposed on ends of the intermediate light-guiding body 113 is longer than the width W of the light-guiding plate 112. This design is employed because if the length L is the same as the width W, triangular dark regions 118 and 118, as illustrated in FIG. 17, are formed on the front light 110. These dark regions 118 and 118 are formed because both ends in the width direction of the light-guiding plate 112 are not adjacent to the intermediate light-guiding body 113 and thus the end regions of the light-guiding plate 112 do not receive light from the intermediate light-guiding body 113. Such dark regions 118 and 118 on the light-guiding plate 112 cause a decrease in the uniformity of the amount of light emitted from the surface of the light-guiding plate 112. As a result, the liquid crystal display unit cannot be illuminated uniformly and brightly and the visibility of the liquid crystal display apparatus is reduced.

The formation of dark regions on the light-guiding plate 112 are prevented by setting the length L longer than the width W, as illustrated in FIG. 16, so that the light-emitting elements 115 and 115 protrude outward from the ends in the width direction of the light-guiding plate 112.

There has been a demand for a reduction in size of a surface-emitting device so that the size of portable electronic appliances, such as mobile phones and portable game machines, can be reduced and various functions can be added to such portable electronic appliances.

However, it has been difficult to meet this demand since, as described above, the overall width of a known surface-emitting device is larger than the width of the light-guiding plate because the light-emitting elements are disposed at the ends of the intermediate light-guiding body at positions further outward than the edges of the light-guiding plate in the width direction. When such a surface-emitting device is mounted in a portable electronic appliance, dead space is formed because of the protruding light-emitting elements.

In another known surface-emitting device, as illustrated in FIG. 18, a plurality of light-emitting diodes (LEDs) 215 is disposed on a light-entering surface 212a of a light-guiding plate 212 to directly guide the light from the LEDs 215 to the light-guiding plate 212. In such a known surface-emitting device, the area near the LEDs becomes extremely bright, causing unevenness in luminance in the vicinity of the entering surfaces 212a. Since this region S with uneven luminance has to be disposed so that it is not included in the display region of the liquid crystal display apparatus, even more dead space is formed compared to the above-described surface-emitting device including the intermediate light-guiding body 113.

SUMMARY OF THE INVENTION

By solving the above-described problems, a surface-emitting device according to an embodiment of the present invention is capable of preventing dark regions from forming in the vicinity of the end surfaces of the light-guiding plate, improving the uniformity of the amount of light emitted from the light-guiding plate, and reducing its overall size by disposing the light-emitting elements at the ends of the intermediate light-guiding body in a manner such that the light-emitting elements do not protrude outward.

A liquid crystal display apparatus including the above-described surface-emitting device according to an embodiment of the present invention has excellent display quality and a reduced size.

An embodiment of the present invention has employed the structure described below.

A surface-emitting device includes a light source and a light-guiding plate for receiving light from the light source through an end surface and emitting the light that has traveled through the light-guiding plate from a first surface. The end surface of the light-guiding plate is a light-entering surface and a plurality of prismatic grooves are formed on a second surface of the light-guiding plate, wherein the prismatic grooves is arranged in a striped pattern when viewed from above. The light source includes an intermediate light-guiding body disposed along the light-entering surface of the light-guiding plate and light-emitting elements disposed at longitudinal ends of the intermediate light-guiding body. A side surface of the intermediate light-guiding body disposed adjacent to the light-entering surface of the light-guiding plate is a light-emitting surface for emitting light from the light-emitting elements to the light-guiding plate, and a side surface of the intermediate light-guiding body disposed opposite to the light-emitting surface is a reflective surface for reflecting the light that has traveled through the intermediate light-guiding body. The total length of the intermediate light-guiding body and the light-emitting elements disposed on both ends of the intermediate light-guiding body is the same as the width of the light-guiding plate. The length of at least the light-emitting surface of the intermediate light-guiding body is the same as the width of the light-guiding plate. The length of the reflective surface is smaller than the length of the light-emitting surface.

In a surface-emitting device having such a structure, light beams emitted from the light-emitting elements travel thought the intermediate light-guiding body and are emitted to the light-guiding plate from the area near the ends of the light-emitting surface having the same length as the light-guiding plate. In this way, light from the intermediate light-guiding body enters the areas near the edges of the light-guiding plate, where a decrease in the emitted amount of light tends to occur. Consequently, dark regions are not formed in the area near the edges of the light-guiding plate and the uniformity of the amount of light emitted from the light-guiding plate can be increased.

Since the length of the reflective surface of the intermediate light-guiding body is smaller than the length of the light-emitting surface, the light-emitting elements can be disposed at the longitudinal ends of the reflective surface. At this time, by disposing the light-emitting elements so that they do not protrude outwards from the light-emitting surface, the total length of the intermediate light-guiding body and the light-emitting elements can be set as the same as the width of the light-guiding plate. Accordingly, the light-emitting elements do not extend outward from the light-guiding plate, and the overall width of the surface-emitting device can be set as substantially the same as the width of the light-guiding plate. In this way, the size of the surface-emitting device can be reduced.

Since the light-emitting elements do not extend outward of the light-guiding plate, when a liquid crystal display apparatus including the surface-emitting device is installed in a portable electronic appliance, dead space due to the protruding light-emitting elements is not formed and the size of the portable electronic appliance can be reduced.

The surface-emitting device according to an embodiment of the present invention may be a surface-emitting device wherein protrusions are formed at the corners adjacent to the light-emitting surface at the ends of the intermediate light-guiding body, depressions for disposing the light-emitting elements are formed at the corners adjacent to the reflective surface at the ends of the intermediate light-guiding body, and light-emitting elements are disposed in the depressions. The surface of the protrusions adjacent to the light-emitting elements can have inclined surfaces. By providing such an inclined surface on the protrusion, light emitted from the light-emitting element disposed on the side opposite to the inclined surface to the intermediate light-guiding body is reflected at the inclined surface, and the amount of light emitted from the areas near the ends of the light-emitting surface to the light-guiding plate increases. As a result, the amount of light entering the areas near the edges of the light-guiding plate increases in comparison to a case in which such inclined surfaces are not provided. Accordingly, the formation of dark regions in the areas near the edges of the light-guiding plate is prevented.

The surface-emitting device may be a surface-emitting device wherein the angle of the inclined surfaces of the protrusions to the light-emitting surface satisfies the following Formula (1):

$$(90-\theta c)/2 < \alpha < (90+\theta c)/2 \qquad (1)$$

where $\alpha$ represents the angle of the inclined surface to the light-emitting surface and $\theta c$ represents the critical angle of the light incident on the inclined surface.

If the angle $\alpha$ is not within the range indicated by Formula (1), the light emitted from the light-emitting element to the intermediate light-guiding body cannot be emitted outside the intermediate light-guiding body even when the light is reflect at the inclined surface. Therefore, the efficiency of preventing the formation of dark regions in the areas near the edges of the light-guiding plate is reduced.

The surface-emitting device may be a surface-emitting device wherein the intermediate light-guiding body comprises acrylic resin having an index of refraction of 1.49 and the angle of the inclined surfaces of the light-emitting surface is within the range of 23.9° to 66.1°. In this way, light emitted from the light-emitting element to the intermediate light-guiding body is reflected at the inclined surface and is efficiently emitted into the light-guiding plate.

A liquid crystal display apparatus according to an embodiment of the present invention includes one of the surface-emitting devices described above, wherein the surface-emitting device is disposed so that the first surface of the light-guiding plate faces the observation side of a liquid crystal display panel.

A liquid crystal display apparatus according to an embodiment of the present invention includes one of the surface-emitting devices described above, wherein the surface-emitting device is disposed so that the first surface of the light-guiding plate faces the side opposite to the observation side of a liquid crystal display panel.

A surface-emitting device according to an embodiment of the present invention prevents the formation of dark region in the area near the edges of the light-guiding plate, improves the uniformity of the amount of light emitted from the light-guiding plate, and has a reduced size since the light-emitting elements disposed at the ends of the intermediate light-guiding body do not protrude outward.

A liquid crystal display apparatus having a reduced size and capable of display high quality images can be provided by including such a surface-emitting device in a liquid crystal display panel.

DESCRIPTION OF THE PREFERRED EMBODIMENTS

Embodiments of the present invention will be described below with reference to the drawings.

First Embodiment

Figure 1:
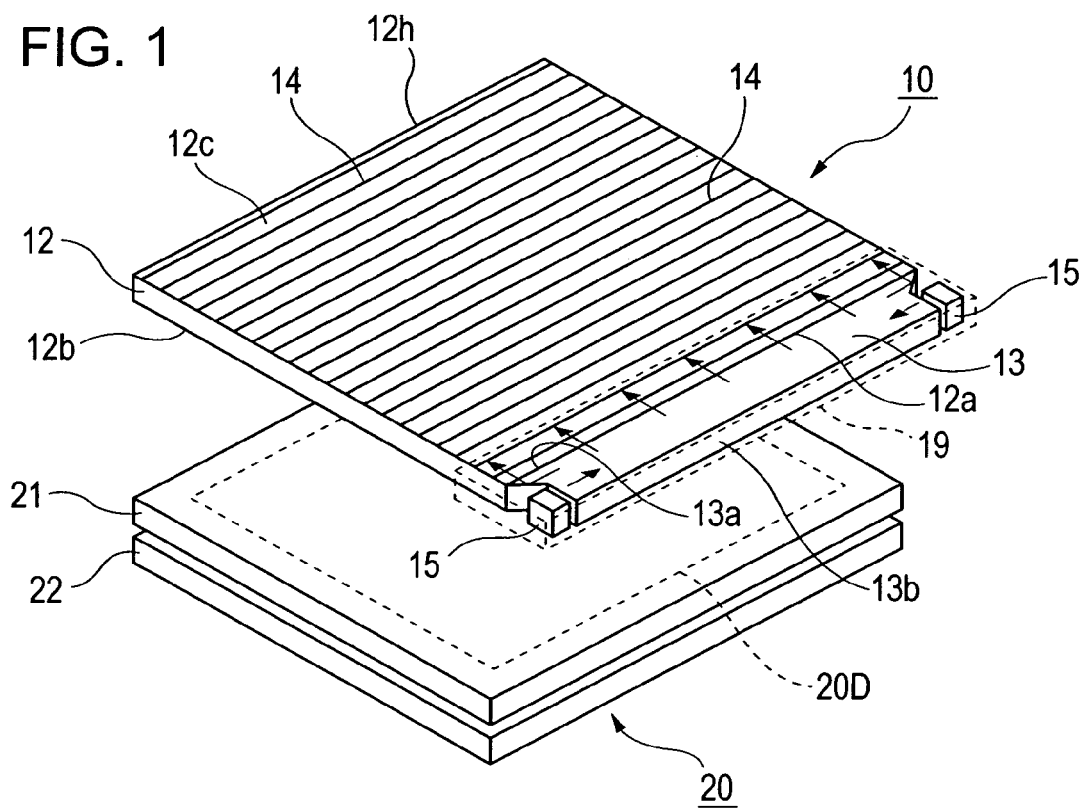
FIG. 1 is a perspective view of a liquid crystal display apparatus according to an embodiment of the present invention.
Figure 2:
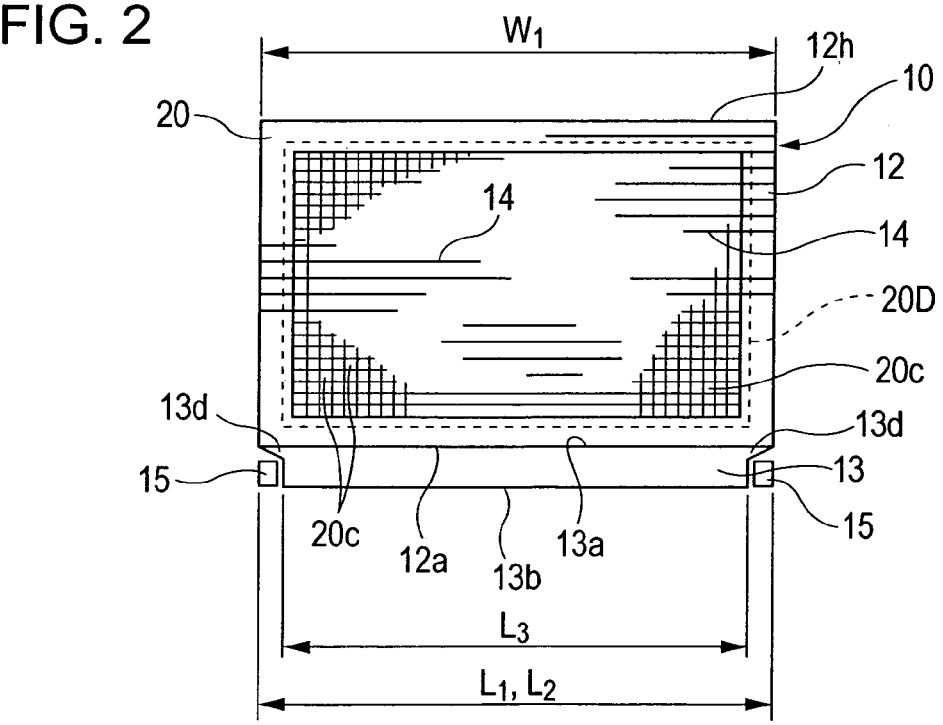
FIG. 2 is a plan view of the liquid crystal display apparatus illustrated in FIG. 1 viewed from the observation side.
Figure 3:
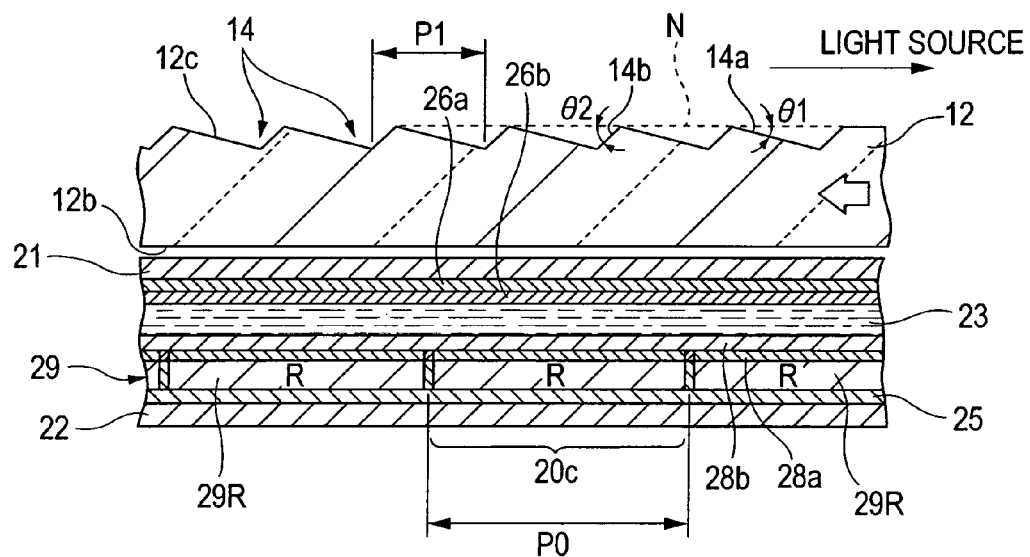
FIG. 3 is a vertical cross-sectional view of the liquid crystal display apparatus illustrated in FIG. 1.

FIG. 1 is a perspective view of a liquid crystal display apparatus according to a first embodiment of the present invention. FIG. 2 is a plan view of the liquid crystal display apparatus illustrated in FIG. 1. FIG. 3 is a cross-sectional view of the liquid crystal display apparatus illustrated in FIG. 1.

The liquid crystal display apparatus according to the first embodiment includes a front light (surface-emitting device) 10 and a reflective liquid crystal display unit (liquid crystal display panel) 20 disposed on the back side (lower side in the drawing) of the front light 10, as illustrated in FIGS. 1, 2, and 3.

Figure 4:
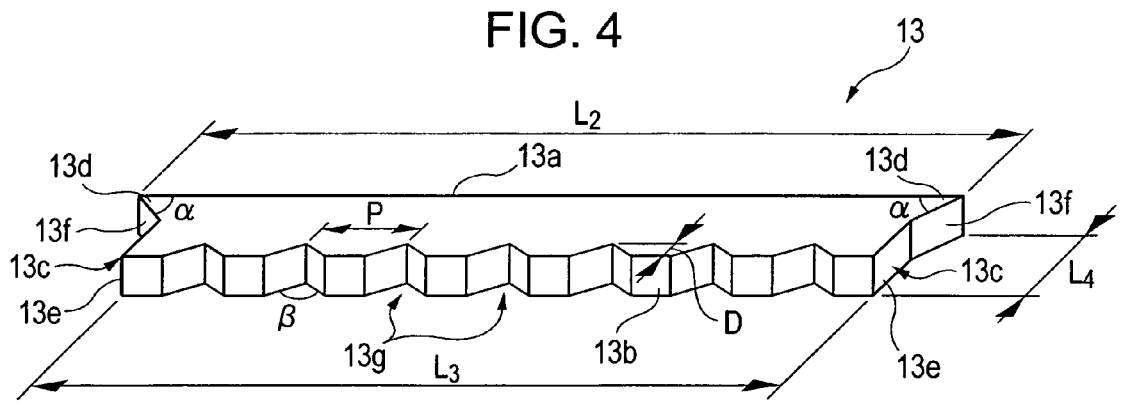
FIG. 4 is an enlarged perspective view of an intermediate light-guiding body of a front light included in the liquid crystal display apparatus illustrated in FIGS. 1 to 3.

FIG. 4 is an enlarged perspective view of an intermediate light-guiding body 13 included in the front light 10.

The front light 10, as illustrated in FIG. 1, includes a substantially flat light-guiding plate 12, a cylindrical intermediate light-guiding body 13 disposed along an end surface (light-entering surface) 12a of the light-guiding plate 12, light-emitting elements 15 and 15 disposed on both ends of the intermediate light-guiding body 13, and a case body (light-blocking body) 19 covering the intermediate light-guiding body 13, the light-emitting elements 15 and 15, and edge portion of the light-guiding plate 12 from the side of the intermediate light-guiding body 13. More specifically, in the front light 10 according to this embodiment, the light source is the intermediate light-guiding body 13 and the light-emitting elements 15 and 15 disposed on both ends of the intermediate light-guiding body 13 and the surface for letting light into the light-guiding plate is the end surface 12a of the light-guiding plate 12.

The light-guiding plate 12 is a flat member disposed on a display area 20D of the liquid crystal display unit 20. The light-guiding plate 12 changes the traveling direction of light emitted from the intermediate light-guiding body 13 and emits this light to the liquid crystal display unit 20. The light-guiding plate 12 is made of transparent acrylic resin.

The flat area of the light-guiding plate 12 is larger than the display area 20D of the liquid crystal display unit 20. As illustrated in FIG. 3, light travels from right i.e., from end surface 12a, to left through the light-guiding plate 12. The surface area of the light-guiding plate 12 corresponding to the display area 20D of the liquid crystal display unit 20 is the display area where light from the front light 10 is transmitted through and displayed on the display area 20D of the liquid crystal display unit 20, which is being illuminated.

As illustrated in the partial cross-sectional view in FIG. 3, the upper surface (second surface) of the light-guiding plate 12 is a reflective surface 12c having a plurality of prismatic grooves 14 parallel to each other forming a striped pattern when viewed from above. The lower surface (first surface) of the light-guiding plate 12 is a light-emitting surface 12b from where light for illuminating the liquid crystal display unit 20 is emitted. The prismatic grooves 14 are provided on the entire area of the reflective surface 12c of the light-guiding plate 12.

Each of the prismatic grooves 14 is formed of a pair of inclined surfaces provided at an angle to a reference surface N of the reflective surface 12c. One of the inclined surface of the pair of surfaces is a gentle slope 14a and the other inclined surface is a steep slope 14b provided at a steeper angle than the gentle slope 14a.

The angle of inclination of the gentle slope 14a is large when the length of the light-guiding plate 12 in the light-traveling direction is short, and the angle of inclination of the gentle slope 14a is small when the length of the light-guiding plate 12 in the light-traveling direction is long. In this way, the brightness of the front light 10 can be maintained uniformly while more light can be used. The light traveling through the light-guiding plate 12 (from right to left in FIG. 3) is reflected at the steep slope 14b of the reflective surface 12c toward the light-emitting surface 12b so that the light is emitted to the liquid crystal display unit 20 disposed adjacent to the light-emitting surface 12b of the light-guiding plate 12.

In addition to acrylic resin, the light-guiding plate 12 may be made of transparent resin, such as polycarbonate resin or epoxy resin, or glass. More specifically, although not limited, the light-guiding plate 12 may be made of Arton (trade name of Japan Synthetic Rubber Co., Ltd.) or Zeonor (trade name of Zeon Corporation).

The amount of light emitted from the entire light-guiding plate 12 becomes more uniform as the thickness of the light-guiding plate 12 is increased. For this reason, the thickness of the light-guiding plate 12 can desirably be set at 0.5 mm or more and, even more desirably, can be set between 0.5 and 1.5 mm.

The cylindrical intermediate light-guiding body 13 is a transparent rectangular cylinder disposed along the end surface (light-entering surface) 12a of the light-guiding plate 12. The light-emitting elements 15 and 15 are disposed on the longitudinal ends of the intermediate light-guiding body 13.

The intermediate light-guiding body 13 may be made of a transparent resin, such as acrylic resin, polycarbonate resin, or epoxy resin, or glass.

The surface of the intermediate light-guiding body 13 adjacent to the end surface 12a of the light-guiding plate 12 is a light-emitting surface 13a for emitting the light from the light-emitting elements 15 and 15 to the light-guiding plate 12. The surface opposite to the light-emitting surface 13a is a reflective surface 13b for reflecting the light traveling through the intermediate light-guiding body 13.

As illustrated in FIG. 2, the total length $L_1$ of the intermediate light-guiding body 13 and the light-emitting elements 15 and 15 disposed on both ends of the intermediate light-guiding body 13 is the same as the width W of the light-guiding plate 12.

As illustrated in FIGS. 2 and 4, at least the length $L_2$ of the light-emitting surface 13a of the intermediate light-guiding body 13 is the same as the width $W_1$ of the light-guiding plate 12, and the length $L_3$ of the reflective surfaces 13b is smaller than the length $L_2$ of the light-emitting surface 13a.

As illustrated in FIG. 4, depressions 13c and 13c for disposing the light-emitting elements 15 and 15 are provided at the corners adjacent to the reflective surface 12c on both ends of the intermediate light-guiding body 13. Light-entering surfaces 13e and 13e for letting light in from the light-emitting elements 15 and 15 are provided on the longitudinal end surfaces of the intermediate light-guiding body 13, where the depressions 13c and 13c are formed.

Protrusions 13d and 13d are formed at the corners adjacent to the reflective surface 12c on both ends of the intermediate light-guiding body 13.

The light-emitting elements 15 and 15 are disposed in the depressions 13c and 13c.

An inclined surface 13f of the protrusion 13d faces the light-emitting element 15.

Figure 5:
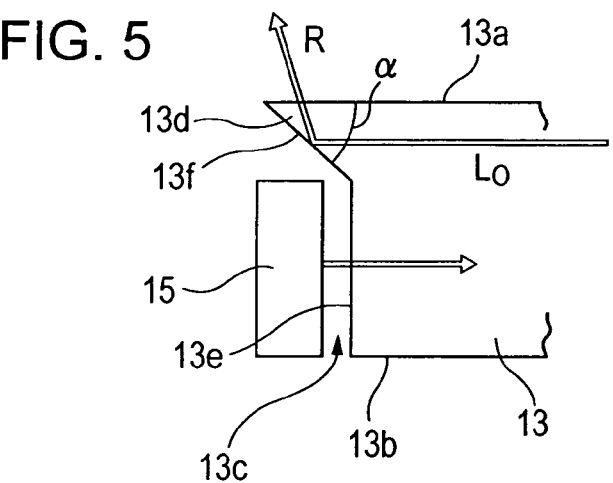
FIG. 5 is an enlarged cross-sectional view of a protrusion and a light-emitting element formed on one end of the intermediate light-guiding body of a front light included in the liquid crystal display apparatus illustrated in FIGS. 1 to 3.

As illustrated in FIG. 5, the inclined surface 13f reflects a light beam $L_0$ emitted to the intermediate light-guiding body 13 from the light-emitting element 15 disposed at the opposite end. Consequently, the amount of light emitted from areas near the ends of the light-emitting surfaces 13a increases and thus the amount of light entering the light-guiding plate 12 increases in comparison to when the inclined surfaces 13f are not provided. As a result, the formation of dark regions on both edges of the light-guiding plate 12 can be prevented.

It is desirable to set the angle α of the inclined surface 13f of the protrusion 13d to the light-emitting surface 13a so that the following Formula (1) is satisfied. In this way, the light emitted from the light-emitting element 15 disposed on the opposite end (the end further away from the protrusion 13d) to the intermediate light-guiding body 13 is reflected at the inclined surface 13f and efficiently guided into the light-guiding plate 12.

$$(90-\theta c)/2 < \alpha < (90+\theta c)/2 \tag{1}$$

where α represents the angle of the inclined surface 13f to the light-emitting surface 13a and θc represents the critical angle of the light incident on the inclined surface 13f.

Now, the principle for setting the angle α of the inclined surface 13f in the above-mentioned range will be described below.

Figure 6:
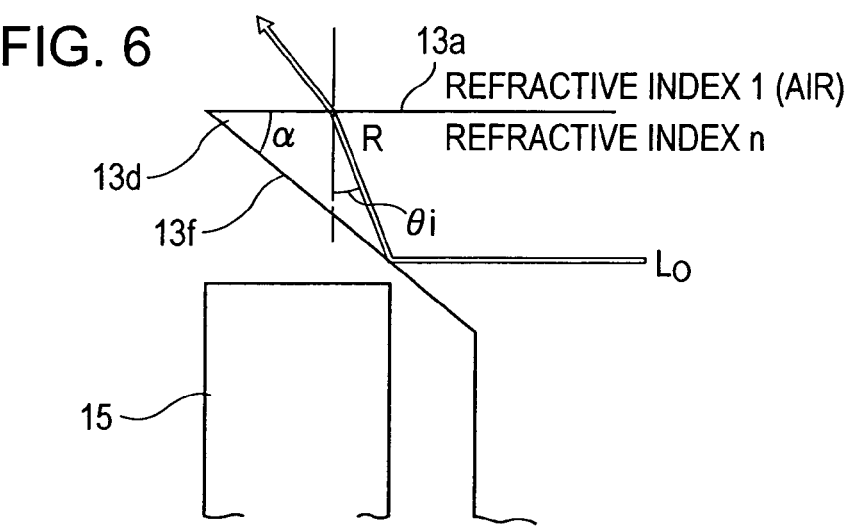
FIG. 6 illustrates the inclined surface of a protrusion formed on the intermediate light-guiding body of a front light included in the liquid crystal display apparatus according to an embodiment for explaining the reason for limiting the angle of the inclined surface.

As illustrated in FIG. 6, a light beam R is obtained when a light beam $L_0$ emitted from the light-emitting element 15 disposed at the end opposite to the protrusion 13d and passed through the intermediate light-guiding body 13 is reflected at the inclined surface 13f. The light beam R cannot travel outside the intermediate light-guiding body 13 unless its incident angle θi on the light-emitting surface 13a is smaller than the critical angle θc. Since the light beam $L_0$ emitted from the light-emitting element 15 travels through intermediate light-guiding body 13 along a path that is substantially parallel to the light-emitting surface 13a, the relationship between the angles θi and θc can be represented by the following Formula (2):

$$\theta i < \theta c \tag{2}$$

Figure 7:
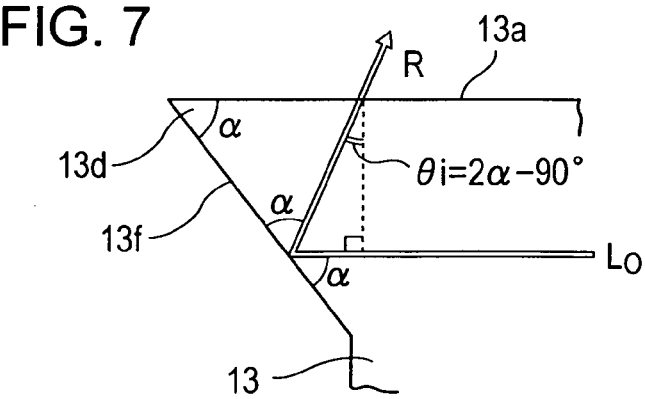
FIG. 7 illustrates the inclined surface of a protrusion formed on the intermediate light-guiding body of a front light included in the liquid crystal display apparatus according to an embodiment for explaining the reason for limiting the angle of the inclined surface.

As illustrated in FIG. 7, when the angle formed between the light beam $L_0$ incident on the inclined surface 13f and the light beam R reflected at the inclined surface 13f is an acute angle, the relationship between the angles θi and θc can be represented by the following Formula (3):

$$\theta i = 2\alpha - 90 < \theta c \tag{3}$$

Figure 8:
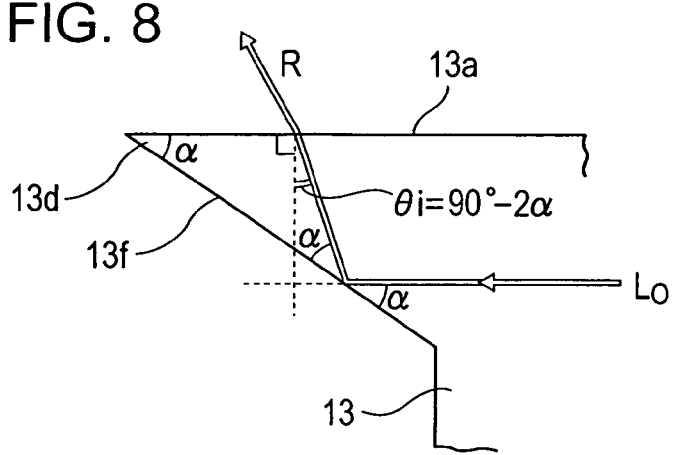
FIG. 8 illustrates the inclined surface of a protrusion formed on the intermediate light-guiding body of a front light included in the liquid crystal display apparatus according to an embodiment for explaining the reason for limiting the angle of the inclined surface.

As illustrated in FIG. 8, when the angle formed between the light beam $L_0$ incident on the inclined surface 13f and the light beam R reflected at the inclined surface 13f is an obtuse angle, the relationship between the angles θi and θc can be represented by the following Formula (4):

$$\theta i = 90 - 2\alpha < \theta c \tag{4}$$

Based on Formulas (3) and (4), the effective range of the angle α of the inclined surface 13f is defined by the above-described Formula (1).

The critical angle θc of the light beam $L_0$ can be calculated by the following Formula (5):

$$\theta c = \sin^{-1}(1/n) \tag{5}$$

where n represents the index of refraction of the material of the intermediate light-guiding body 13.

Based on Formulas (1) to (5), it is desirable for the angle α of the inclined surface 13f of the intermediate light-guiding body 113 made of acrylic resin having an index of refraction of 1.49 to be set in the range represented by the following Formula (6):

$$23.9° < \alpha < 66.1° \tag{6}$$

As illustrated in FIG. 4, the reflective surfaces 13b opposite to the light-emitting surface 13a of the intermediate light-guiding body 13 is a prismatic surface having a plurality of grooves 13g, which are wedge-shaped when viewed from above, provided parallel to each other. The light beams emitted from the light-emitting elements 15 and 15 travel through the longitudinal direction of the intermediate light-guiding body 13, are reflected at the inner surfaces of the wedge-shaped grooves 13g, and are emitted toward the light-guiding plate 12. The depth D of the wedge-shaped grooves 13g are set larger for the grooves 13g formed further away from the light-emitting elements 15 and 15. In other words, the grooves 13g near the center of the reflective surfaces 13b in the longitudinal direction are the deepest and the grooves 13g near the ends of the reflective surfaces 13b are the shallowest. In this way, the uniformity of the light emitted at the end surface 12a of the light-guiding plate 12 can be improved.

The uniformity of the light emitted to the end surface 12a of the light-guiding plate 12 can also be improved by reducing the pitch P of the wedge-shaped grooves 13g (the distance between the roots of adjacent grooves 13g) formed further away from the light-emitting elements 15 and 15.

It is desirable to set the groove angle β of the groove 13g to an obtuse angle in order to improve the luminance of the light emitted at the end surface 12a of the light-guiding plate 12.

The prismatic surface of the intermediate light-guiding body 13 having the plurality of wedge-shaped grooves 13g functions as a reflective surface by being provided with a reflective film (not shown in the drawings) composed of a highly reflective metal film, such as an aluminum film or a gold film. In this way, the amount of light entering the light-guiding plate 12 can be increased by increasing the reflectance of the prismatic surface.

The light-emitting elements 15 and 15 are not limited so long as they can be disposed in the depressions 13c formed at the ends of the intermediate light-guiding body 13 in a manner such that they do not extend beyond the length of the light-emitting surface 13a. For example, white LEDs and organic electroluminescent (EL) devices may be used as the light-emitting elements 15 and 15.

The liquid crystal display unit 20 is a reflective liquid crystal display unit capable of displaying images in color. As illustrated in FIG. 3, the liquid crystal display unit 20 includes a liquid crystal layer 23 interposed between an upper substrate 21 and a lower substrate 22, wherein the upper and lower substrates 21 and 22 oppose each other. On the inner side of the upper substrate 21, a plurality of transparent electrodes 26a shaped as rectangles extending in the horizontal direction when view from above, and an alignment film 26b formed on the transparent electrodes 26a. On the inner side of the lower substrate 22, a reflective layer 25, a color filter layer 29, a plurality of transparent electrodes 28a shaped as rectangles when viewed from above, and an alignment film 28b are stacked in order from the lower substrate 22.

The rectangular display area 20D, as indicated by a dotted line in FIG. 1, is the display area of the liquid crystal display unit 20. As illustrated in FIG. 2, matrix of pixels 20c is provided in the display area 20D.

In the liquid crystal display apparatus according to an embodiment, the front light 10 is disposed on the liquid crystal display unit 20 so that the light-emitting surface 12b of the front light 10 faces the observation side of the liquid crystal display unit 20 (i.e., faces the upper substrate 21). Images displayed on the liquid crystal display unit 20 are transmitted through the light-guiding plate 12 of the front light 10 so that the images are can be viewed by a viewer.

In dark areas where no outside light can be obtained, the liquid crystal display unit 20 is illuminated by illuminating the light-emitting elements 15 and 15, guiding the light from the light-emitting elements 15 and 15 through the intermediate light-guiding body 13 and the end surface 12a into the light-guiding plate 12, and emitting the light from the light-emitting surface 12b of the light-guiding plate 12 to the liquid crystal display unit 20.

In the front light 10 according to this embodiment, the total length $L_1$ of the intermediate light-guiding body 13 and the light-emitting elements 15 and 15 disposed on both ends of the intermediate light-guiding body 13 is the same as the width $W_1$ of the light-guiding plate 12, the length $L_2$ of the light-emitting surface 13a of the intermediate light-guiding body 13 is also the same as the width $W_1$ of the light-guiding plate 12, and the length $L_3$ of the reflective surface 13b is shorter than the length $L_2$ of the light-emitting surface 13a. In this way, a larger amount of light is emitted at the area near the edges of the light-guiding plate 12, which is an area where, in a known surface-emitting device, a decrease in the emitted amount of light tends to occur. Consequently, the uniformity in the amount of light emitted from the light-guiding plate 12 is improved.

Since the light-emitting elements 15 and 15 do not protrude outward from the width $W_1$ of the light-guiding plate 12, the overall size of the front light 10 can be reduced to substantially the same size as the light-guiding plate 12. Since the liquid crystal display apparatus according to this embodiment includes the front light 10 having the light-emitting elements 15 and 15 that protrude much less, the amount of dead space created by the protruding light-emitting elements 15 and 15 when installed in a portable electronic appliance is reduced. Accordingly, the size of the portable electronic appliance can be reduced.

Figure 9:
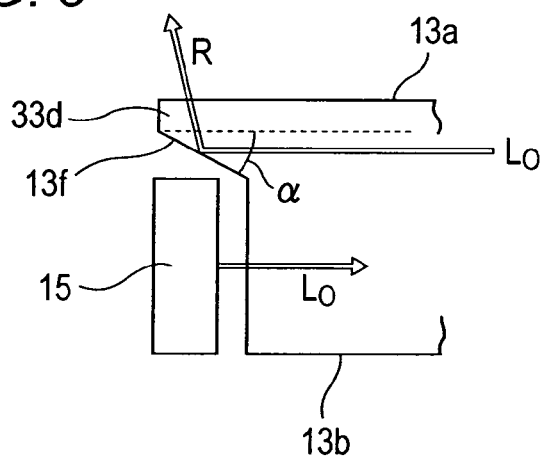
FIG. 9 is an enlarged cross-sectional view of a protrusion formed on the intermediate light-guiding body of a front light included in the liquid crystal display apparatus according to another embodiment.
Figure 10:
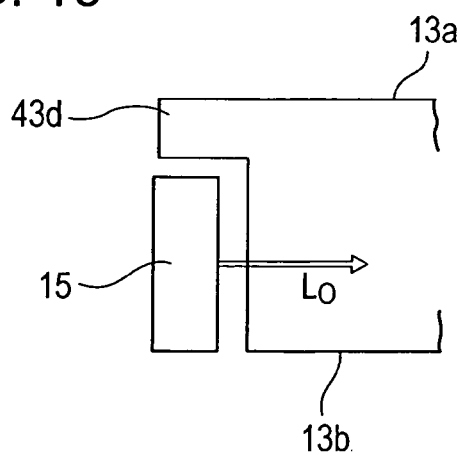
FIG. 10 is an enlarged cross-sectional view of a protrusion formed on the intermediate light-guiding body of a front light included in the liquid crystal display apparatus according to another embodiment.

According to the above-described first embodiment, the protrusion 13d is shaped as substantially triangular prism, as illustrated in FIGS. 4 and 5. However, as illustrated in FIG. 9, instead of the protrusion 13d, a protrusion 33d that is shaped as a rectangular prism having the inclined surface 13f facing the light-emitting element 15 may be provided or, as illustrated in FIG. 10, a protrusion 43d that is shaped as rectangular prism not having an inclined surface may be provided. It is desirable, however, to a provide protrusion having the inclined surface 13f one each end of light-guiding plate 12 because more light can be provided to the vicinity of the ends of the light-guiding plate 12.

The liquid crystal display unit 20 including the front light (surface-emitting device) 10 according to the above-described first embodiment is a reflective liquid crystal display unit. The liquid crystal display unit 20, however, may be a transmissive or a semi-transmissive liquid crystal display unit. For a transmissive or a semi-transmissive liquid crystal display unit, at least one retardation plate and a deflecting plate are disposed on the lower side of the lower substrate, and the front light (surface-emitting device) 10 according to the above-described first embodiment is disposed on the lower side of the deflecting plate. The light-emitting surface 12b (a first surface) of the light-guiding plate 12 of the front light (surface-emitting device) 10 faces the lower side (opposite to the observation side) of the liquid crystal display unit. For a semi-transmissive liquid crystal display unit, a plurality of transmission holes is formed in the reflective layer to transmit light from the back light 10.

Another Embodiment

Figure 11:
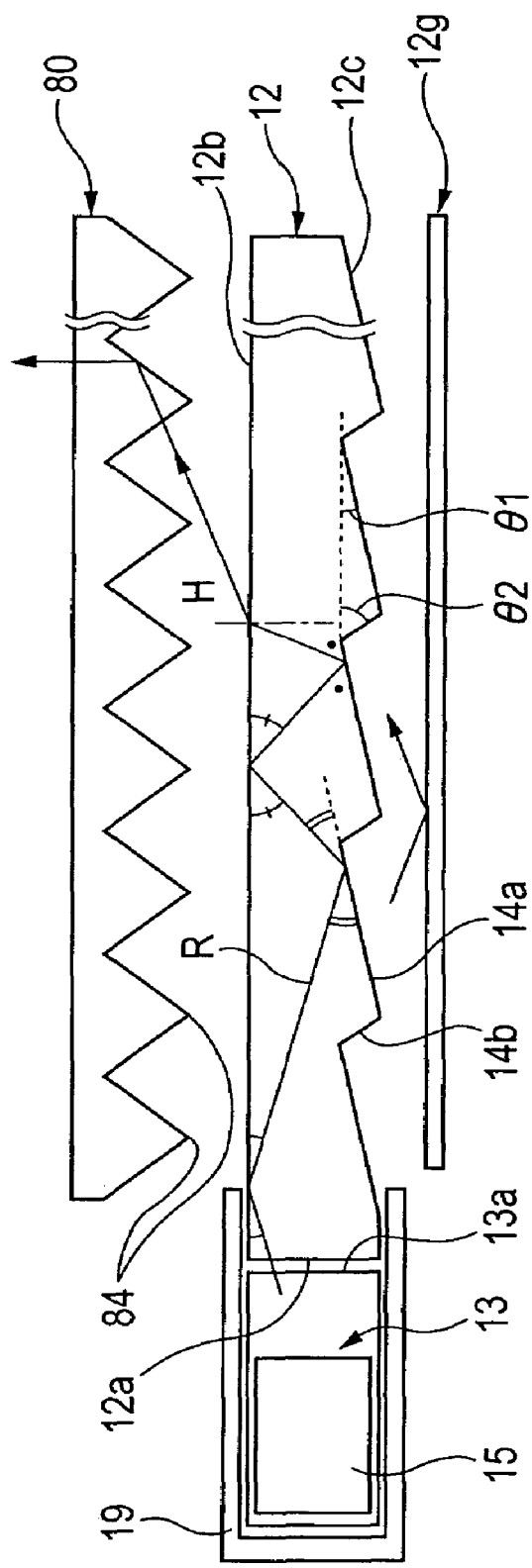
FIG. 11 is a vertical cross-sectional view of a back light using a surface-emitting device according to an embodiment of the present invention.
Figure 12:
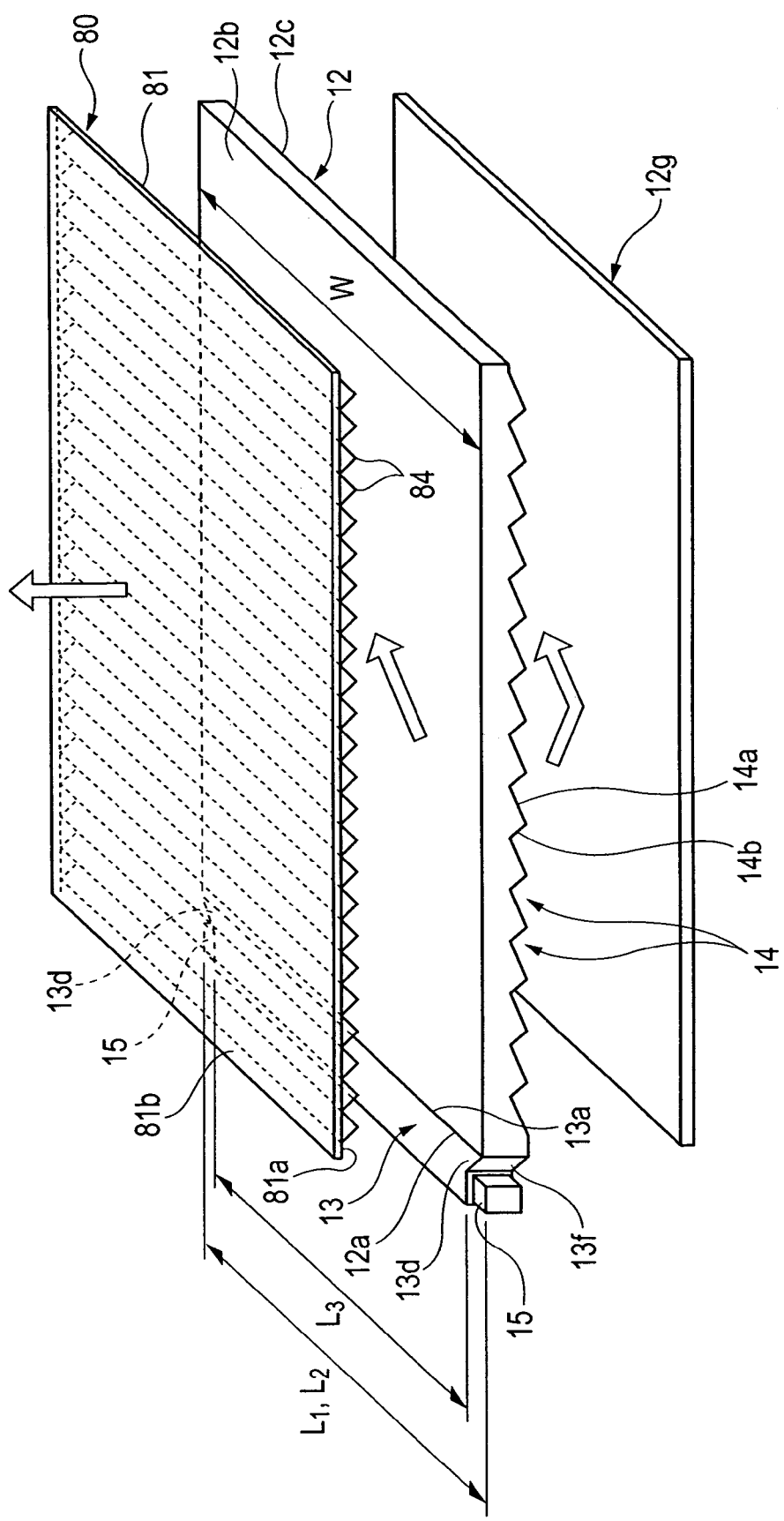
FIG. 12 is an exploded perspective view of the back light illustrated in FIG. 11.

FIG. 11 is a vertical cross-sectional view of a back light (surface-emitting device) according to another embodiment of the present invention. FIG. 12 is an exploded perspective view of the back light illustrated in FIG. 11.

The back light (surface-emitting device) according to this embodiment, as illustrated in FIGS. 11 and 12, includes a prism sheet 80, a reflective surface 12c, and a reflective plate 12g. The prism sheet 80 is disposed on a light-emitting surface 12b of a light-guiding plate 12. The reflective surface 12c is formed opposite to the light-emitting surface 12b as a prismatic surface and includes a plurality of parallel grooves 14 having wedge-shaped cross-sections. The reflective plate 12g is made of silver and is disposed on the reflective surface 12c. Similar to the above-described first embodiment, a cylindrical intermediate light-guiding body 13 is disposed along the end surface (light-entering surface) 12a of the light-guiding plate 12. Light-emitting elements 15 and 15 are disposed at both ends of the intermediate light-guiding body 13. Protrusions 13d and 13d are formed at the corners adjacent to the light-emitting surface 13a.

The prism sheet 80 is constituted of a transparent sheet 81 having a series of protruding light-diffraction members 84 formed on a light-entering surface 81a (the side facing the light-guiding plate 12) of the transparent sheet 81. Each of the light-diffraction members 84 is a protrusion having a diffractive surface and a reflective surface. A light-emitting surface 81b opposing the light-entering surface 81a of the transparent sheet 81 is a flat surface. The transparent sheet 81 constituting the prism sheet 80 may be made of transparent resin, such as acrylic resin, polycarbonate-based resin, or epoxy resin, or glass.

A light beam incident on the transparent sheet 81 at an angle is passed through the diffractive surface of the light-diffraction members 84 and then is reflected at the inner side of the reflective surface of the transparent sheet 81 toward the light-emitting surface 81b.

When the back light according to this embodiment is included in a liquid crystal display unit, the prism sheet 80 is interposed between the light-guiding plate 12 and the liquid crystal display unit.

In the back light according to this embodiment, a light beam R emitted from the light-emitting surface 13a of the intermediate light-guiding body 13 inters into the light-guiding plate 12 from the end surface 12a. The light beam R is guided through the light-guiding plate 12 so that the light beam R gradually becomes orthogonal to the light-emitting surface 12b. When the angle of that the light beam R to the normal line H becomes smaller than the critical angle, the light beam R passes through the light-emitting surface 12b.

EXAMPLE

An example of en embodiment the present invention will now be described in detail below. This example, however, does not limit the scope of the present invention.

In this example, a back light (surface-emitting device) according to an embodiment, such as the one illustrated in FIG. 11, including an intermediate light-guiding body was manufactured. Then, the luminance distribution of the surface of a light-guiding plate of the back light was measured. Based on this measurement, it was verified that by employing the structure according to an embodiment of the present invention, uniformity of the amount of light emitted from the surface of the light-guiding plate was improved due to a decrease in dark regions that emit a reduced amount of light formed at both edges of the light-guiding plate.

A light-guiding plate 12 and an intermediate light-guiding body 13, such as those illustrated in FIGS. 4 and 11, were manufactured by injection molding. The intermediate light-guiding body 13 was formed as a rectangular cylinder made of acrylic resin. In the intermediate light-guiding body 13, the length $L_2$ of a light-emitting surface 13a was set as 66.8 mm, the length $L_3$ of a reflective surface 13b opposite to the light-emitting surface 13a was set as 64.4 mm, the width $L_4$ was set as 3.4 mm, and the thickness was set as 0.9 mm. Protrusions 13d and 13d, shaped as triangular prisms, were formed on both longitudinal ends of the intermediate light-guiding body 13. Then, V-shaped grooves 13g with a groove angle β of 102° were formed on a reflective surface 13b opposing the light-emitting surface 13a. The pitch of the grooves 13g were set between the range of 0.25 mm (both ends) to 0.211 mm (center) so that the pitch gradually decreased from the ends to the center, i.e., so that the grooves 13g formed closer to light-emitting elements 15 and 15 disposed at the ends of the intermediate light-guiding body 13 have a shorter pitch. The depth of the grooves 13g were set between the range of 7.6 μm (both ends) to 73.5 μm (center) so that the depth gradually increased from the ends to the center, i.e., so that the grooves 13g formed closer to the light-emitting elements 15 and 15 disposed at the ends the intermediate light-guiding body 13 are deeper. The angle α of an inclined surface 13f of the protrusion 13d adjacent to the light-emitting element 15 was set as 36.6°. The total length $L_1$ of the intermediate light-guiding body 13 and the light-emitting elements 15 and 15 was set as 66.8 mm.

In depressions on both ends of the intermediate light-guiding body 13, LEDs were disposed as light-emitting elements. For the LEDs, NSCW215T (product of Nichia Corporation) was used.

The size of the light-guiding plate 12 was set as:

66.8 mm($W_1$)×52.6 mm(length)×0.8 mm(thickness)

The structure of the light-guiding plate 12 was the same as the light-guiding plate illustrated in FIG. 11 in which a plurality of wedge-shaped prismatic grooves was formed on the reflective surface 12c. The light-guiding plate 12 was made of acrylic resin. The pitch of the prismatic groove was set to 0.20 mm. The steep slope and gentle slope of the inclined surfaces constituting each plasmatic groove were set at angles of 50° and 2.5°, respectively.

A prism sheet 80 was stacked on the light-emitting surface 12b of the light-guiding plate 12, and a reflective plate 12g composed of a silver film was formed on the reflective surface 12c opposite to the light-emitting surface 12b. The prism sheet 80 was constituted of a transparent sheet made of acrylic resin.

The LEDs were disposed in the depressions formed at the longitudinal ends of the cylindrical intermediate light-guiding body 13. Then, the intermediate light-guiding body 13 was disposed on an end surface 12a of the light-guiding plate 12. In this way, the back light (surface-emitting device) according to this example was constituted.

The back light according to this example, manufactured by the steps described above, was disposed on the back of a liquid crystal display unit 20. Both of the LEDs were illuminated to measure the white display luminance distribution of a display region D of the liquid crystal display unit 20. The results of the measurement are shown in Table 1 and FIG. 13.

Figure 13:
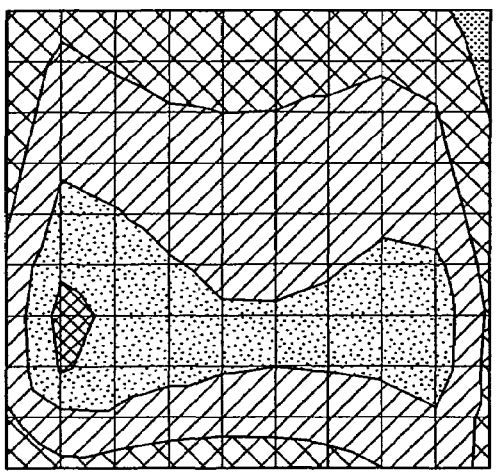
FIG. 13 illustrates the luminance distribution of the liquid crystal display apparatus having the back light according to a first example.

To measure the luminance distribution, the display region 20D was divided into 100 sections, when viewed from above, and the luminance of the center point of each section was measured. FIG. 13 illustrates the average luminance of the display area 20D for when the display area 20D is assumed to be viewed by the viewer's left eye (i.e., when the display unit is tilted 10° so that the left side of the display unit in the width direction is disposed closer to the measuring apparatus) and for when the display area 20D is assumed to be viewed by the viewer's right eye (i.e., when the display unit is tilted 10° so that the right side of the display unit in width direction is disposed closer to the measuring apparatus).

The change in luminance (%) was derived from the measured values of the luminance distribution. The derived results are shown in Table 2 and FIG. 14.

The change in luminance is the difference between the luminance of a back light including an intermediate light-guiding body without protrusions (the intermediate light-guiding body described below in the first comparative example) and the luminance of a back light including an intermediate light-guiding body having protrusions (the intermediate light-guiding body according to the first embodiment). The larger the difference in the obtained luminance, the larger the positive effect of the protrusions on the back light to increase luminance.

TABLE 1

Example: With Protrusions (A)

| | | | | | | | | | |
|---|---|---|---|---|---|---|---|---|---|
| 19 | 28 | 25 | 24 | 23 | 23 | 24 | 25 | 23 | 14 |
| 22 | 32 | 29 | 27 | 27 | 28 | 27 | 28 | 29 | 28 | 17 |
| 24 | 35 | 33 | 31 | 30 | 30 | 32 | 33 | 30 | 20 |
| 26 | 39 | 37 | 34 | 32 | 33 | 34 | 36 | 33 | 21 |
| 29 | 43 | 41 | 37 | 35 | 36 | 36 | 39 | 36 | 24 |
| 32 | 48 | 45 | 41 | 38 | 38 | 39 | 42 | 41 | 27 |
| 35 | 53 | 48 | 44 | 41 | 41 | 42 | 44 | 46 | 29 |
| 34 | 51 | 46 | 43 | 41 | 40 | 41 | 42 | 45 | 28 |
| 29 | 38 | 37 | 35 | 34 | 34 | 35 | 36 | 39 | 26 |
| 24 | 27 | 27 | 25 | 25 | 24 | 26 | 30 | 38 | 27 |

Average Luminance: 33 cd/m²

TABLE 2

Distribution of Change in Luminance (A/B)

| | | | | | | | | | |
|---|---|---|---|---|---|---|---|---|---|
| 16 | 5 | −4 | −5 | −6 | −5 | −3 | −1 | 2 | 9 |
| 14 | 4 | −3 | −5 | −5 | −4 | −3 | 0 | 5 | 11 |
| 10 | 5 | −2 | −3 | −3 | −2 | −1 | −1 | 3 | 13 |
| 10 | 5 | 0 | −2 | −3 | −1 | 0 | 0 | 1 | 9 |
| 13 | 4 | −3 | −4 | −4 | −2 | 0 | 0 | 0 | 12 |
| 20 | 5 | −2 | −3 | −4 | −2 | −2 | −1 | 1 | 17 |
| 19 | 3 | −2 | −3 | −4 | −4 | −5 | −5 | 1 | 17 |
| 14 | −3 | −7 | −5 | −6 | −7 | −9 | −8 | −1 | 10 |
| 6 | −11 | −17 | −12 | −10 | −9 | −10 | −7 | −3 | 6 |
| −19 | −32 | −33 | −27 | −22 | −20 | −18 | −11 | −3 | 1 |

Comparitive Example

An intermediate light-guiding body (comparative example) was manufactured in the same manner as the intermediate light-guiding body according to the above-described example, except that the lengths of a reflective surface opposite to a light-emitting surface were both set as 64.4 mm and protrusions and depressions were not formed at the ends of the intermediate light-guiding body. LEDs were disposed at the longitudinal ends of the intermediate light-guiding body. The total length of the LEDs and the intermediate light-ing guiding body according to this comparative example was set as the same as the width of a light-guiding plate.

The structure of a back light (surface-emitting device) according to this comparative example was the same as the structure of the back light (surface-emitting device) according to the above-described example, except that the above-described intermediate light-guiding body according to the comparative example was used.

Figure 15:
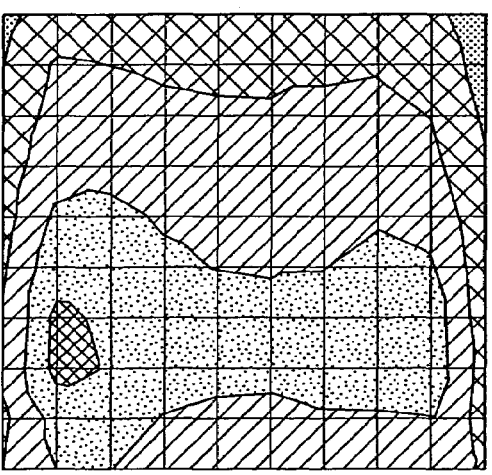
FIG. 15 illustrates the luminance distribution of the liquid crystal display apparatus having the back light according to a comparative example.
Figure 16:
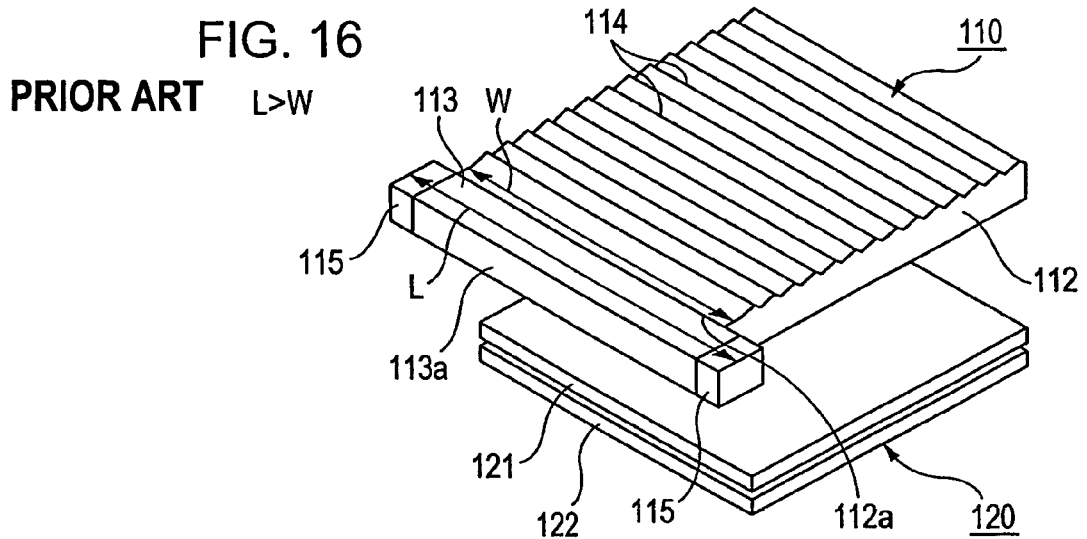
FIG. 16 is a perspective view of the overall structure of a known liquid crystal display apparatus having a front light.
Figure 17:
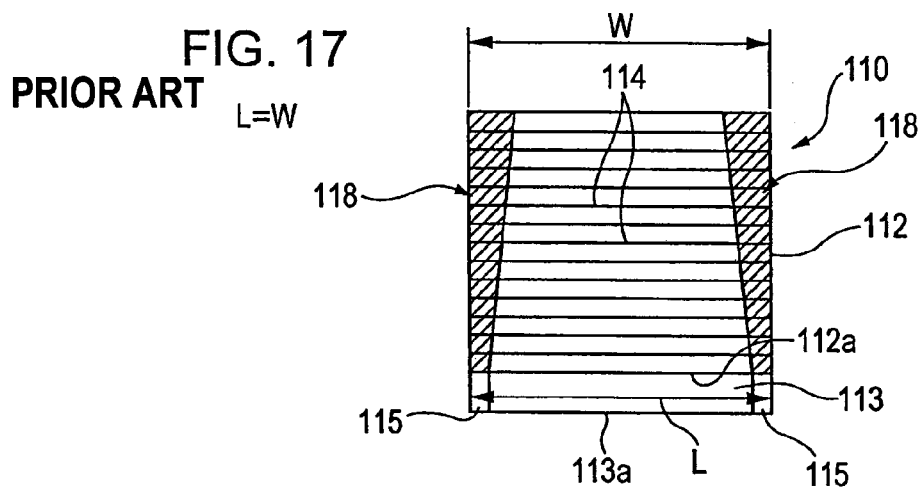
FIG. 17 is a plan view of another known front light viewed from the observation side.
Figure 18:
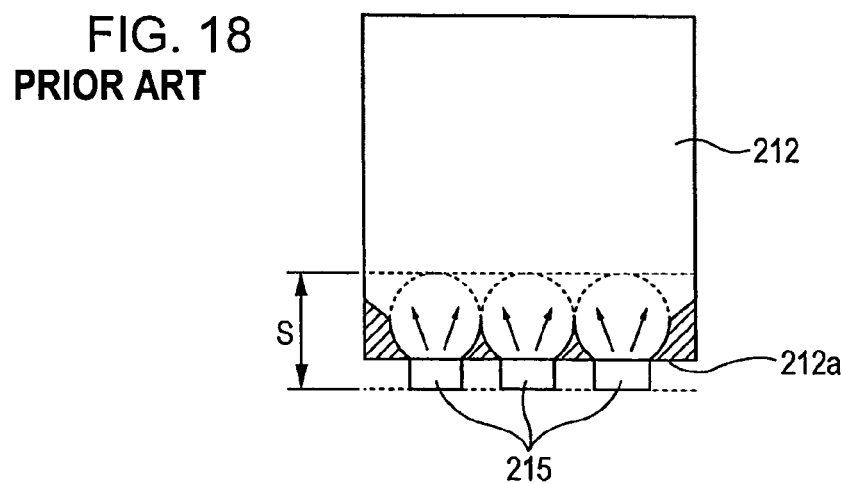
FIG. 18 is a plan view of another known surface-emitting device viewed from the observation side.

The back light according to this comparative example was disposed on the back of a liquid crystal display unit similar to that according to the above-described example and then both of the LEDs were illuminated. The white display luminance distribution of the liquid crystal display unit was measured in the same manner as the above-described example. The results of the measurement are shown in Table 3 and FIG. 15.

TABLE 3

Comparative Example: No Protrusions (B)

| | | | | | | | | | |
|---|---|---|---|---|---|---|---|---|---|
| 16 | 26 | 26 | 25 | 25 | 24 | 24 | 25 | 22 | 13 |
| 19 | 31 | 30 | 29 | 28 | 28 | 28 | 29 | 26 | 15 |
| 22 | 34 | 34 | 32 | 31 | 31 | 32 | 33 | 30 | 17 |
| 24 | 37 | 37 | 34 | 33 | 34 | 35 | 36 | 33 | 20 |
| 26 | 41 | 42 | 39 | 37 | 36 | 36 | 39 | 37 | 22 |
| 27 | 46 | 46 | 42 | 40 | 39 | 40 | 42 | 41 | 23 |
| 29 | 51 | 49 | 45 | 43 | 43 | 44 | 46 | 45 | 25 |
| 30 | 53 | 49 | 45 | 43 | 43 | 45 | 46 | 45 | 25 |
| 27 | 43 | 45 | 39 | 38 | 37 | 39 | 39 | 40 | 25 |
| 29 | 40 | 40 | 34 | 32 | 30 | 31 | 34 | 39 | 27 |

Average Luminance: 34 cd/m²

Figure 14:
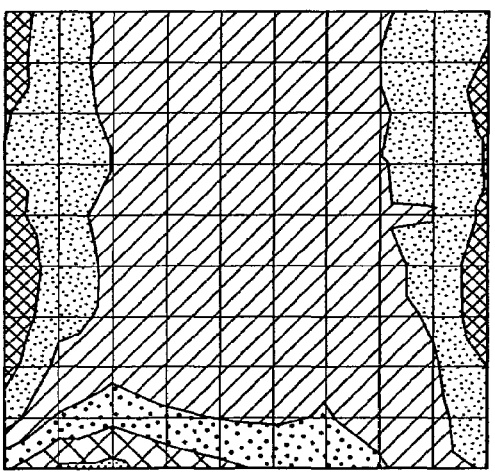
FIG. 14 illustrates the change in the luminance of the liquid crystal display apparatus having the back light according to a first example.

It can be concluded from the results shown in Table 2 and FIG. 14 that an increase in luminance, as shown in Table 2, in the vicinity of both ends of the intermediate light-guiding body having the protrusions with the inclined surfaces adjacent to the LEDs has been observed in comparison to the luminance of the intermediate light-guiding body not having protrusion. Consequently, by using a back light including an intermediate light-guiding body having protrusions with inclined surfaces formed adjacent to light-emitting elements (LEDs) can provide more light to the sides of the light-guiding plate so as to increase the uniformity of the amount of light emitted from the light-guiding plate.

What is claimed is:

1. A surface-emitting device comprising:
a light source; and
a light-guiding plate for receiving light from the light source through an end surface and emitting the light that has traveled through the light-guiding plate from a first surface; wherein
the end surface of the light-guiding plate for guiding light is a light-entering surface and a plurality of prismatic grooves are formed on a second surface of the light-guiding plate, the prismatic grooves being arranged in a striped pattern when viewed from above,
the light source comprises an intermediate light-guiding body disposed along the light-entering surface of the light-guiding plate and light-emitting elements disposed at both longitudinal ends of the intermediate light-guiding body,
a side surface of the intermediate light-guiding body disposed adjacent to the light-entering surface of the light-guiding plate is a light-emitting surface for emitting light from the light-emitting elements to the light-guiding plate and a side surface of the intermediate light-guiding body disposed opposite to the light-emitting surface is a reflective surface for reflecting the light that has traveled through the intermediate light-guiding body, and
a total length of the intermediate light-guiding body and the light-emitting elements disposed on both ends of the intermediate light-guiding body is the same as a width of the light-guiding plate a length of at least the light-emitting surface of the intermediate light-guiding body is the same as the width of the light-guiding plate and a length of the reflective surface is smaller than the length of the light-emitting surface.

2. The surface-emitting device according to claim 1, wherein protrusions are formed at corners adjacent to the light-emitting surface at the ends of the intermediate light-guiding body, depressions for disposing the light-emitting elements are formed at corners adjacent to the reflective surface at the ends of the intermediate light-guiding body, and the light-emitting elements are disposed in the depressions.

3. The surface-emitting device according to claim 2, wherein surfaces of the protrusions opposing the light-emitting elements are inclined surfaces.

4. The surface-emitting device according to claim 3, wherein an angle of the inclined surfaces of the protrusions to the light-emitting surface satisfies the following Formula (1):

$$(90-\theta c)/2 < \alpha < (90+\theta c)/2 \quad (1)$$

where $\alpha$ represents the angle of the inclined surface to the light-emitting surface and $\theta c$ represents the critical angle of the light incident on the inclined surface.

5. The surface-emitting device according to claim 3, wherein the intermediate light-guiding body comprises acrylic resin having an index of refraction of 1.49 and an angle of the inclined surfaces of the light-emitting surface is within the range of 23.9° to 66.1°.

6. A liquid crystal display apparatus comprising:

the surface-emitting device according to claim 1;

wherein the surface-emitting device is disposed so that the first surface of the light-guiding plate faces an observation side of a liquid crystal display panel.

7. A liquid crystal display apparatus comprising:

the surface-emitting device according to claim 1;

wherein the surface-emitting device is disposed so that the first surface of the light-guiding plate faces a side opposite to an observation side of a liquid crystal display panel.

* * * * *